June 16, 1964  N. S. ANDERSON  3,137,854
LOCATING SYSTEM FOR DETECTABLE ENERGY
Filed May 19, 1959  3 Sheets-Sheet 1

NEAL S. ANDERSON
INVENTOR.

BY
ATTORNEYS

June 16, 1964   N. S. ANDERSON   3,137,854
LOCATING SYSTEM FOR DETECTABLE ENERGY
Filed May 19, 1959   3 Sheets-Sheet 2

NEAL S. ANDERSON
INVENTOR.

BY
ATTORNEYS

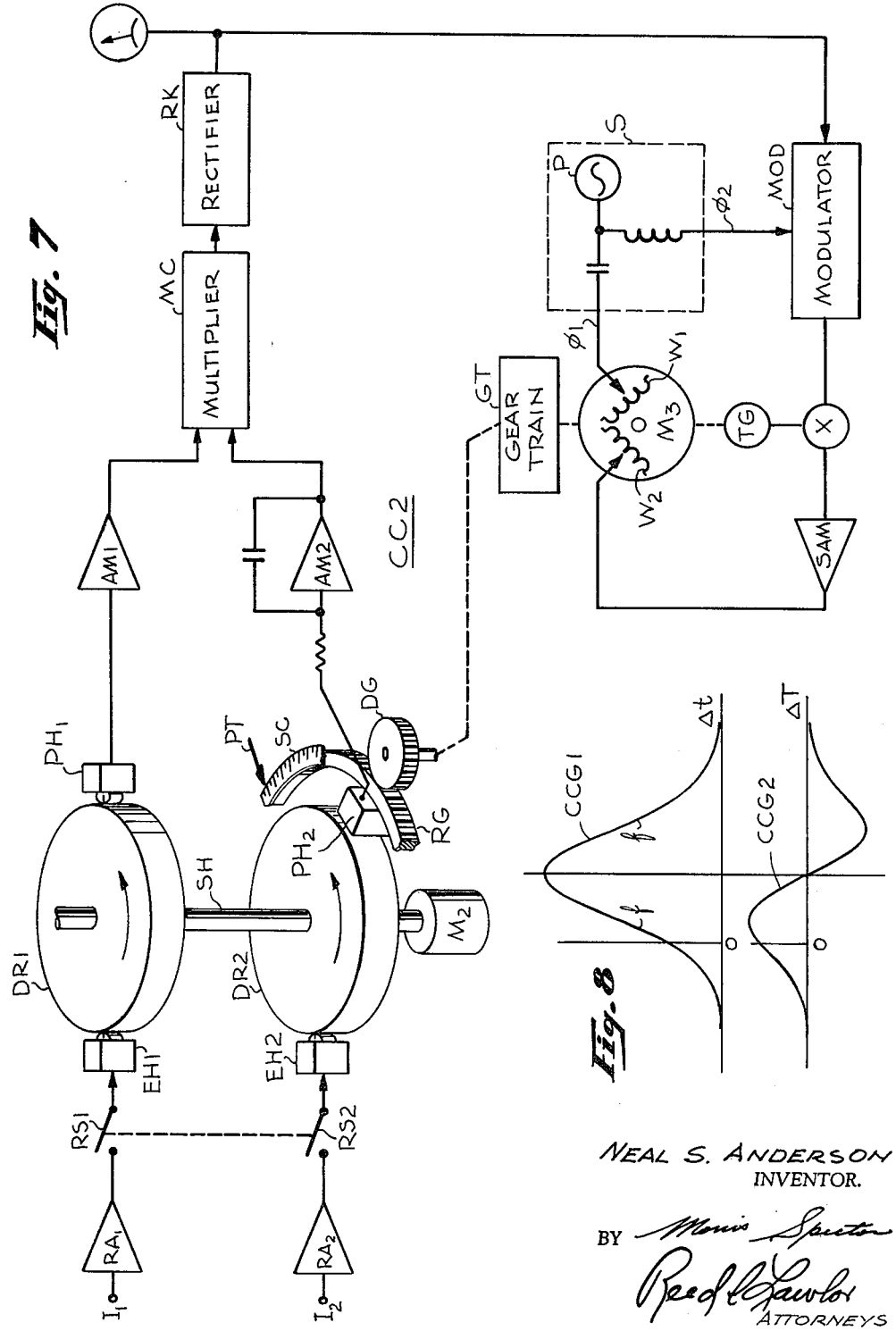

United States Patent Office 3,137,854
Patented June 16, 1964

3,137,854
LOCATING SYSTEM FOR DETECTABLE ENERGY
Neal S. Anderson, Rolling Hills, Calif., assignor to Thompson Ramo Wooldridge Inc., Los Angeles, Calif., a corporation of Ohio
Filed May 19, 1959, Ser. No. 814,279
20 Claims. (Cl. 343—112)

This invention relates to methods and apparatus useful in locating sources of detectable energy such as radiant energy of the electromagnetic variety. This invention is applicable to many different kinds of energy and may be used under a wide variety of conditions. The invention is primarily concerned with the locating of radiant energy sources by means of signals that are received at mutually spaced points between which there is no communication during the times that the radiant energy signals are received. The invention is useful both for civilian and military purposes.

A specific civilian application to which the invention is applicable involves the locating of unlicensed radio transmitters. One military application involves the location of enemy transmitters in an area under surveillance. Both of the foregoing applications involve the detection of radio waves. In another civilian application, sources of noise or other sounds can be located. In a corresponding military application, underground operations, submarines, and depth bombs may be located by means of this invention. The invention is also applicable to the analysis of air traffic in an area under surveillance.

In most systems for locating sources of radiant energy, whether the energy be acoustic or electromagnetic, the energy emitted from the source to be located is received at a plurality of receiving stations, and all the received signals are recorded on a common recording medium. In such systems, signals received at the various stations are either transmitted to a recorder over wires or are relayed thereto by radio transmission.

But in some applications, it is extremely inconvenient to provide wire communication between receivers at the different receiver stations. Such inconvenience arises, for example, where government agents operating in different trucks move about an area to record signals from an unlicensed transmitter in an effort to locate the transmitter. It is also not only inconvenient but practically impossible to provide such wire communications over long distances during military or surveillance operations in enemy territory, since the wire transmission system may reveal the location of the recording system and the existence of the surveillance operation itself. It is also very undesirable in military operations to transmit the received signals by radio to a home base where the various received signals are to be recorded, as the signals so transmitted are apt to be detected by the enemy.

From the foregoing explanation, it is clear that it is very desirable to be able to record signals from unknown sources that are to be located without requiring concurrent communication between the various receiving stations and a common recording station.

According to this invention, a system is provided for recording signals from an unknown station at a plurality of separate receiving stations between which there is no communication, but in such a way that an accurate determination may be made of the differences in times required for signals to travel from the unknown source to the respective receiving stations. According to this invention, a recording is made at each receiving station of signals that are transmitted from a known source as well as signals that are received from the unknown source. Both the signals from the known source and the signals from the unknown source are recorded in reproducible form on a common recording medium. By making such records at at least two pairs of receiving stations, the records so produced may be employed to locate the unknown source. In the best mode of practicing this invention, the records produced at the respective receiving stations are collected when desired and transported to an interpretation center where the various records are reproduced in order to measure the differences in times of arrival of the signals from the unknown source at the receivers of each pair. In this system, the records of the signals from the known source provide a common time base to facilitate the measurement of the time delay in the arrival of the same signals from the unknown source. This measurement is, in a preferred form of the present invention, carried out by means of a novel servo controlled record reproducing system which employs signal correlation processes as a means for maintaining a predetermined relation between the mechanical motion of two or more separate records.

Though, as pointed out above, the invention is also applicable to the locating of sources of acoustic energy, the invention is especially applicable to the locating of sources of radio waves, and is most useful, accurate and reliable when employed in the detection of radio waves. For this reason the invention is described below with particular reference to a system for locating radio waves. It will be understood, however, that the invention is not limited to that particular application, but that such application is described because it represents the best and most important mode of practicing the invention. Also the novel record reproducing system shown and described hereinafter, although constituting the preferred way of realizing one aspect of the present invention, is in itself useful apart from direction locating systems of the type shown.

The various advantages and features of the invention will be understood from the following description taken in connection with the accompanying drawings wherein:

FIGURE 7 illustrates an alternative system for measuring time delays automatically; and FIGURE 8 is a graph employed in explaining the operation of the system of FIGURE 7.

Figure 1:
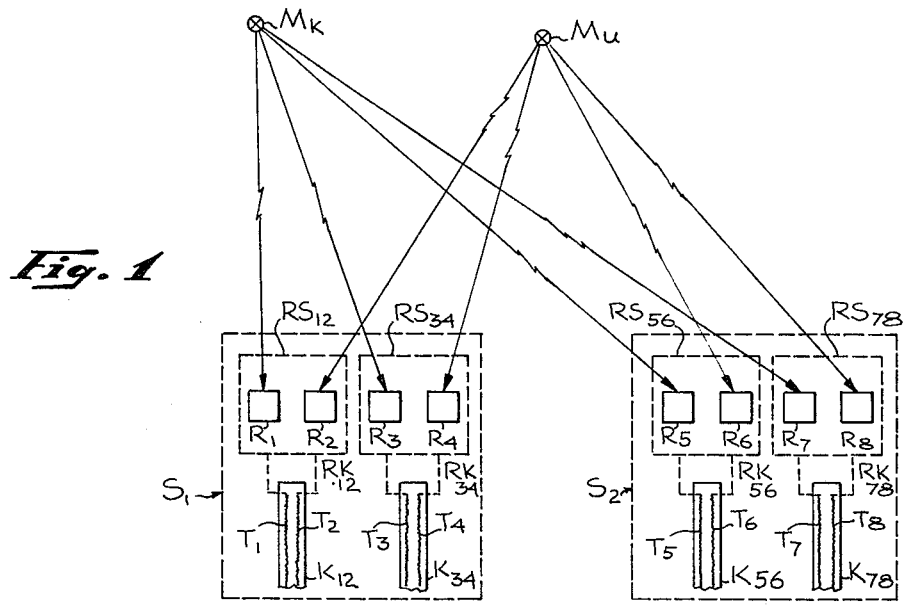
FIGURE 1 is a schematic diagram of a recording system employing this invention.

In FIG. 1 of the drawings, there is illustrated a system in which records are made of signals that are received from both an unknown radiant energy source and a known radiant energy source in order to locate the unknown source in accordance with the invention. In this specification, the term "known radiant energy source" means a source of radiant energy that is located at a known position, while the term "unknown radiant energy source" means a source of radiant energy the location of which is to be determined. Also, the terms "known" and "unknown" are frequently used with reference to parts, signals and locations corresponding to the known and unknown sources. As illustrated in FIGURE 1, the unknown source $M_u$ is located at an unknown position in the area under investigation, and the known source $M_k$ is located at a known position. The known source $M_k$ is a radio transmitter, the location of which is known in advance or from other measurements, while the unknown source $M_u$ is a radio transmitter which is being employed by an enemy agent to transmit information to a home base, or which is being used to transmit commands from a military headquarters to various service units. Clearly there are many occasions when it is important to be able to locate an unknown source under a cloak of secrecy. Such occasions may arise either within an enemy territory or within friendly territory.

In any event, in accordance with this invention, a plurality of receiver pairs are moved into the vicinity of the area under investigation and are located at known positions relative to that area. Each receiver pair is located at a separate receiver station or site and signals from both the unknown source $M_u$ and the known source $M_k$ are recorded at the various receiver stations to provide records which may be employed to locate the unknown source $M_u$. In FIG. 1, four such receiver pairs are shown, namely: the pair $R_1$, $R_2$, the pair $R_3$, $R_4$, the pair $R_5$, $R_6$, and the pair $R_7$, $R_8$. They are located at corresponding receiver stations $RS_{12}$, $RS_{34}$, $RS_{56}$ and $RS_{78}$. Where the sources $M_u$ and $M_k$ are in the form of radio transmitters, the receivers $R_1 \ldots R_8$ are in the form of radio receivers.

One member of each pair of receivers is tuned to selectively received waves from the known transmitter $M_k$, and the other member of each pair is tuned to selectively received radio waves from the unknown transmitter $M_u$. More particularly, the receivers identified by the odd subscripts, namely, the receivers $R_1$, $R_3$, $R_5$, and $R_7$, are selectively tuned to receive radio waves transmitted from the known source $M_k$. Similarly, the receivers identified by the even subscripts, namely, the receivers $R_2$, $R_4$, $R_6$ and $R_8$, are selectively tuned to receive radio waves transmitted from the unknown source $M_u$. As indicated, each pair of receivers is located at a known position. Furthermore, in the best embodiment of the invention, the receivers of each pair are so close together that radio waves from each of the transmitters $M_u$ and $M_k$ arrive at the two receivers of that pair at substantially the same instant. At least if such waves from either transmitter arrive at either of the receivers at a receiver station with any time delay due to the spacing between the receivers, such time delay is negligible compared with the time delays that arise in the transmission of signals from either transmitter to receivers at different receiver stations. In practice, the two receivers at any one receiver station are at practically identical points, to all intents and purpose. Thus, identity of location may be achieved by employing the same receiving antenna for the two receivers at each receiver station.

In the specific embodiment of the invention illustrated, the two pairs of receivers $R_1$, $R_2$, and $R_3$, $R_4$ are located at two relatively close receiver stations $RS_{12}$ and $RS_{34}$, respectively, while the other two pairs of receivers $R_5$, $R_6$, and $R_7$, $R_8$ are located at a different pair of relatively closely spaced receiver stations $RS_{56}$ and $RS_{78}$, respectively. The two pair of receiver stations $RS_{12}$, $RS_{34}$ and $RS_{56}$, $RS_{78}$ form corresponding station groups $S_1$ and $S_2$. For best results, the distances between the station groups $S_1$ and $S_2$ are made large compared with the distances between the stations of each group.

A dual-channel magnetic tape recorder RK is located at each receiver station RS in order to make simultaneous recordings of the waves received at that station by the two receivers located there from the two transmitters to which the respective receivers are tuned. Thus, four dual-channel recorders $RK_{12}$, $RK_{34}$, $RK_{56}$ and $RK_{78}$ are employed at the four corresponding receiver stations $RS_{12}$, $RS_{34}$, $RS_{56}$ and $RS_{78}$, respectively. It will be understood by those skilled in the art that each of the radio receivers is of a type which receives, detects and amplifies the received electromagnetic waves in order to reproduce the signal transmitted from the corresponding transmitter as an electrical wave that corresponds to the electrical wave that modulates the wave transmitted from the source or the modulated wave itself. The rectified output of each receiver is impressed upon a corresponding recording head of the associated dual-channel magnetic tape recorder. As a result, signals that are transmitted from each transmitter are recorded as a corresponding track on the magnetic tape recorder at the station at which the signal is received. More particularly, it commonly occurs that the signals emitted from both of the transmitters $M_u$ and $M_k$ are in the form of radio waves which are modulated at a low frequency such as frequencies in the audio range. This would occur, for example, where the radio waves being transmitted by the respective transmitters are being modulated by voice signals.

Figure 2:
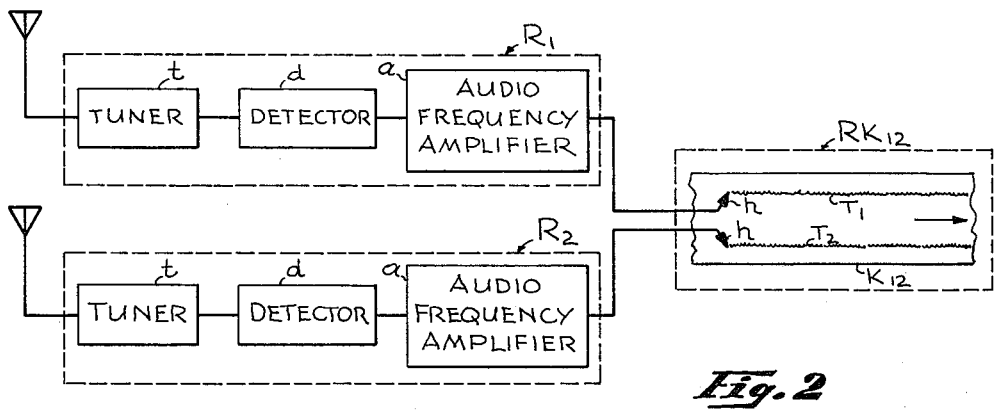
FIGURE 2 is a block diagram of a system that is employed for reproducing the records and for measuring the time delays involved in the transmission of the signals from a source to the receivers.

To illustrate, at the receiving station $RS_{12}$, each of the radio receivers $R_1$ and $R_2$ includes a tuner $t$, a detector $d$, and an audio frequency amplifier $a$, and the output of each of the amplifiers $a$ is impressed upon a corresponding recording head $h$ of a magnetic tape recorder $RK_{12}$, all as illustrated schematically in FIG. 2. With such an arrangement and with the two tuners tuned to the frequencies of the known and unknown transmitters $M_k$ and $M_u$, signals transmitted from the known and unknown transmitters $M_k$ and $M_u$ are simultaneously recorded on separate tracks at $T_1$ and $T_2$ of a common tape $K_{12}$ at the receiver station $RS_{12}$. Likewise, with this arrangement, at the station $RS_{34}$, signals transmitted from the known and unknown transmitters $M_k$ and $M_u$ are simultaneously recorded on separate tracks at $T_3$ and $T_4$ of a common tape $K_{34}$. Likewise, with this arrangement, at the station $RS_{56}$, signals transmitted from the known and unknown transmitters $M_k$ and $M_u$ are simultaneously recorded on separate tracks at $T_5$ and $T_6$ of a common tape $K_{56}$. And likewise with this arrangement, at the station $RS_{78}$, signals transmitted from the known and unkonwn transmitters $M_k$ and $M_u$, are simultaneously recorded on separate tracks at $T_7$ and $T_8$ of a common tape $K_{78}$. Thus, in this embodiment of the invention, four dual-track tape recordings are made respectively at the four different stations of signals that are transmitted concurrently from the two radiant energy sources $M_u$ and $M_k$.

Subsequently the four tapes, properly identified, are brought to a central processing station or interpretation center. Here the four records are analyzed, as explained hereinafter, in order to determine the location of the unknown transmitter $M_u$. Inasmuch as the location of the known transmitter $M_k$ is known, and inasmuch as the locations of the receiver stations RS are also known, and inasmuch as the velocity of transmission of radio waves is known, it is a simple matter to compute the relative times at which the same signal emitted from the known transmitter $M_k$ arrives at the respective receiver stations. This information is employed to establish a time base to aid in locating the unknown station $M_u$. Whereas the relative times of arrival of signals from the known station $M_k$ are computed in the manner indicated, the relative times of arrival of waves from the unknown source $M_u$ at the respective group of stations $S_1$ and $S_2$ are determined from the records, and the two time delay determinations are employed to locate the unknown station $M_u$.

In accordance with the present invention, the four records on a pair of tapes from one receiver group are played back simultaneously, and the two signals from the known station are cross-correlated to determine their relative time displacement on the records, and the two signals corresponding to the unknown transmitter are likewise cross-correlated to determine their time displacement on the record, and the data are employed in order to determine the time delay in the transmission of the signal from the unknown transmitter to the two receiver stations corresponding to the two records in question. In accordance with the invention, a synchronizing operation is performed by reducing the time displacement between the record track of the waves from one transmitter to zero, and the time displacement between the record tracks from the other transmitter is determined by cross-correlation to measure the time delay in the arrival of waves from the unknown source at the two receiver stations. In practice, data from two records (four tracks) from one pair of receiver stations are employed to determine a single hyperbolic locus or path upon which the unknown station is located, and similar data from a second pair of receiver stations is employed to determine another such locus or path, and the intersection of the two paths provides an indication of the location of the unknown source. Though each pair is independent of the other, in the best embodiment of the invention, the two pairs may have a single receiver station in common.

Figure 3:
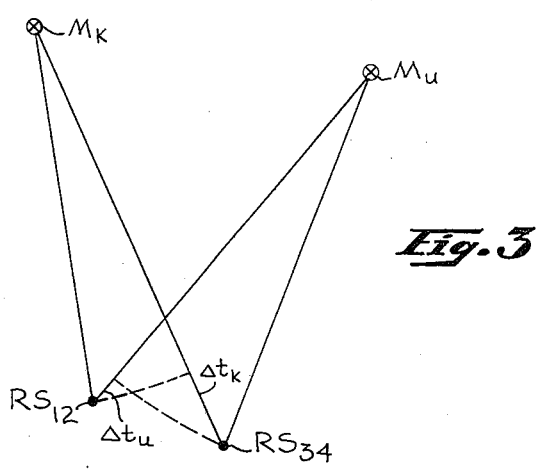
FIGURE 3 is a graph illustrating how the measurements obtained in this system may be employed in locating an unknown source on a map.

In FIG. 3 the relationship of the delay times of the signals from the two stations are indicated. Referring to this figure, it is to be noted that the delay time $\Delta t$ corresponding to a signal from the unknown transmitter $M_u$ is $\Delta t_u$ and the delay time corresponding to the known transmitter $M_k$ is $\Delta t_k$. In other words, $\Delta t_u$ is the difference in times of arrival at the receiver stations $RS_{12}$ and $RS_{34}$ of signals that are emitted simultaneously from the unknown transmitter $M_u$ and which travel directly to the receivers at those stations. Likewise, $\Delta t_k$ is the difference in times of arrival at the receiver stations $RS_{12}$ and $RS_{34}$ of signals that are emitted simultaneously from the known transmitter $M_k$ and which travel directly to the receivers at those stations. It is to be noted that in the particular case illustrated, if the time of arrival at the first receiver station $RS_{12}$ is taken as zero, then $\Delta t_k$ is inherently positive, but $\Delta t_u$ is inherently negative. The reason for this is that a signal from the known station $M_k$ arrives at the receiver station $RS_{34}$ after it arrives at the receiver station $RS_{12}$, but a signal transmitted from the unknown receiver station $M_u$ arrives at the receiver station $RS_{34}$ before it arrives at the receiver station $RS_{12}$. As will be apparent, this invention is concerned hereinafter with the difference between these delays. For convenience, this difference will sometimes be referred to as $\Delta^2 t$, that is $\Delta(\Delta t)$. Generally speaking, the following equation expresses the relationship between the time delays and the time delay difference:

$$\Delta^2 t = \Delta t_u - \Delta t_k$$

Though the invention is described herein particularly with reference to a system in which voice-modulated radio frequency waves are rectified prior to recording, it will be understood that the invention is also applicable where the voice-modulated radio frequency waves are recorded directly without rectification. Recording with rectification may be employed satisfactorily where the distances between the two receivers of a pair of stations is many miles apart. However, where the stations are very close together, being no farther apart than a few miles, recording of waves without prior rectification is best. The reason for this is that radio waves travel with a velocity of 186,000 miles per second, and that it is desirable that identical parts or phases of the recorded signals be recorded with a time delay which is comparable to the periods of the signals. Thus, rectification prior to recording may be used where a very large area is under surveillance, but recording without prior rectification is used where only a small area is under surveillance.

Figure 4:
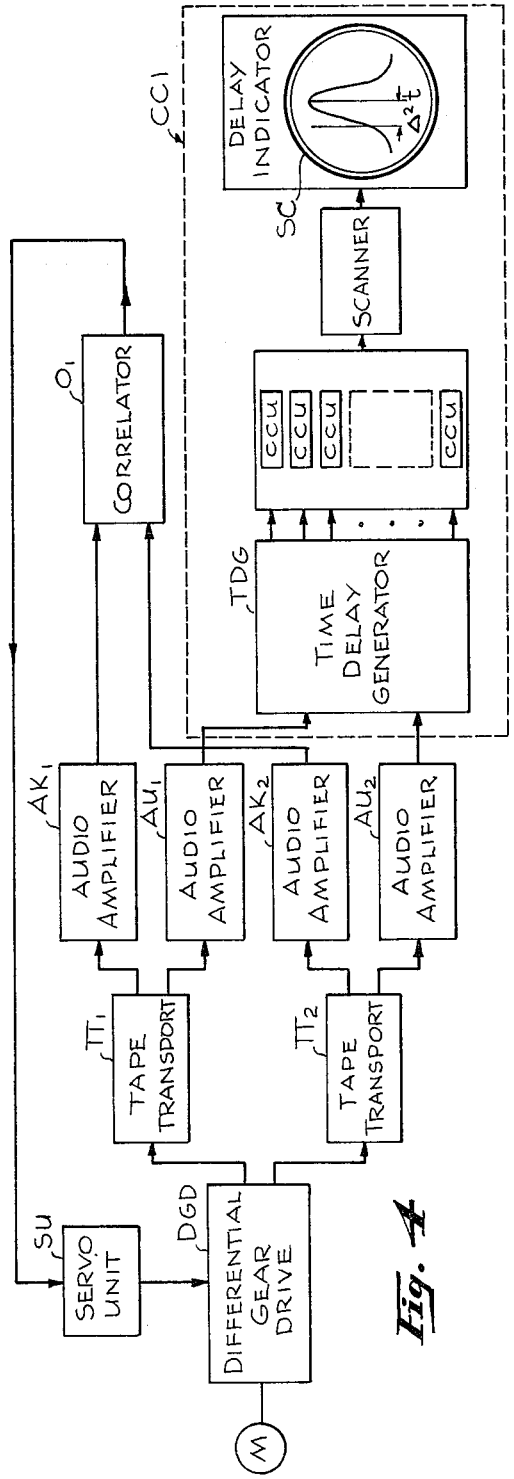
FIGURE 4 is a block diagram of a system employed for reproducing the signals measuring the time delays.

In FIG. 4 there is illustrated a block diagram of a system employed in accordance with this invention to measure the time delay difference $\Delta^2 t$.

In the signal reproducing system of the present invention illustrated in FIG. 4, two dual-channel tape transports $TT_1$ and $TT_2$ are employed for reproducing the signals previously recorded on the two tapes at a pair of receiver stations. The two tape transports are driven by a common motor M through a differential gear drive DGD so that the relative time displacement of the record tracks of two signals recorded on the two tapes at one pair of receiver stations can be synchronized. To simplify the explanation, let it be assumed at the outset that the two magnetic tape records $K_{12}$ and $K_{34}$ have been mounted on the two tape transports $TT_1$ and $TT_2$, respectively, and that the differential gear drive DGD has been set so that the two tracks $T_1$ and $T_3$ are not synchronized.

In order to achieve synchronization in the reproduction of the two known tracks $T_1$ and $T_3$, in accordance with the invention, the outputs of the known amplifiers $AK_1$ and $AK_2$ are applied to a correlator $O_1$. This correlator is of a type which produces a signal of zero amplitude in its output when the two signals fed to its input are in synchronism and which produces positive or negative signals in its output according to whether the signal from the amplifier $AK_1$ leads or lags the signal from the amplifier $AK_2$, respectively. By properly phasing the signal generated in the output of the correlator $O_1$ and applying it to a servo-unit SU which drives the differential gear drive DGD, the differential gear drive is, in accordance with the invention, rotated in such a direction as to reduce the time displacement between the signals to a null, or 0, value.

It is not necessary to describe the correlator $O_1$ in detail, since such correlators are now well known. Such a correlator multiplies together the two signals supplied thereto from the known amplifiers $AK_1$ and $AK_2$ and adds or integrates the products over a predetermined period of time. The output of the correlator is in the form of a D.C. current, the magnitude and polarity of which are a function of the derivative of the cross-correlation coefficient, or factor, of the two signals applied to its input. The cross-correlation coefficient has a sharp maximum only when the two signals applied to its input are closely matched in time. The output of the correlator $O_1$ is zero when the two signals applied to its input are synchronized but is positive or negative when a signal leads or lags the other as the case may be. The output of the correlator $O_1$ is employed to drive a servo-unit SU in such a way as to operate the differential gear drive to produce and maintain a signal of maximum amplitude at the output of the correlator $O_1$. One type of correlator and servo-unit suitable for this purpose is illustrated in FIG. 7 and described hereinafter.

With this arrangement, the signals recorded on the tracks $T_1$ and $T_2$ of the tape $K_{12}$ are reproduced by the tape transport $TT_1$ and fed through the audio-frequency amplifiers $AK_1$ and $AU_1$ respectively. Likewise, with this arrangement, the signals recorded on the tracks $T_3$ and $T_4$ of the tape $K_{34}$ are reproduced by the tape transport $TT_2$ and fed through the audio-frequency amplifiers $AK_2$ and $AU_2$ respectively. Thus, the two signals from the known transmitter $M_k$ that were received by the receivers $R_1$ and $R_3$ are reproduced in the outputs of the known amplifiers $AK_1$ and $AK_2$. Likewise, the two signals from the unknown transmitter $M_u$ that were received by the receivers $R_2$ and $R_4$ are reproduced in the output of the unknown amplifiers $AK_2$ and $AU_2$.

With this arrangement employing the differential gear drive DGD, the correlator $O_1$ and the servo-unit SU, the two known signals recorded on the different tapes $K_{12}$ and $K_{34}$ are continuously synchronized automatically. With this arrangement, the time difference at which identical components of the signal from the unknown station $M_u$ which are reproduced in the outputs of the unknown amplifiers $AU_1$ and $AU_2$ is equal to the time delay difference $\Delta^2 t$. In accordance with this invention, this time delay difference $\Delta^2 t$ is measured with the apparatus of FIG. 4 and this difference $\Delta^2 t$ is then added to the known time delay $\Delta t_k$ between the arrival of signals from the known transmitter $M_k$ at the two receiver stations $RS_{12}$ and $RS_{34}$ in order to determine the time delay $\Delta t_u$ in the arrival of signals from the unknown transmitter $M_u$ at the two receiver stations $RS_{12}$ and $RS_{34}$.

In order to determine the time delay difference $\Delta^2 t$, the outputs of the unknown signal amplifiers $AU_1$ and $AU_2$ are applied to an automatic cross-correlation function generator $CC_1$, which is designed to indicate the time displacement between two signals from the same source. Such a cross-correlator $CC_1$ may be of the type described and claimed in co-pending application Serial No. 707,033, filed by Cecil E. Williams on January 3, 1958, now Patent No. 3,096,501. In that cross-correlator, signals from two sources, such as the outputs of the unknown amplifiers $AU_1$ and $AU_2$ are impressed upon a time delay generator TDG that reproduces each of the signals a plurality of times but at predetermined time intervals.

Thus, for example, the signal from the amplifier $AU_1$ may be reproduced as 100 simultaneously existing signals in the output of the time delay generator, the signals occurring at different times but displaced by predetermined uniform time intervals such as one microsecond. Likewise, signals from the output of the other unknown signal amplifier $AU_2$ may be reproduced in the output of the time delay generator as 100 identical signals which occur in a similar sequence with successive signals displaced in time by the same predetermined uniform time interval. With this arrangement, the two sets of signals appearing in the output of the time delay generator are applied to a plurality of cross-correlation and computing units CCU that produce in their respective outputs currents that are proportional to the cross-correlation coefficients of the signals impressed upon their respective inputs. By applying signals from each of the two sets of time delayed signals to each cross-correlation unit CCU in pairs with different time displacements between them, a plurality of signals are produced at the output of the cross-correlation units CCU which represent the cross-correlation coefficients as a function of the time displacement between the two signals impressed upon the input of the time delay generator TDG.

Figure 5:
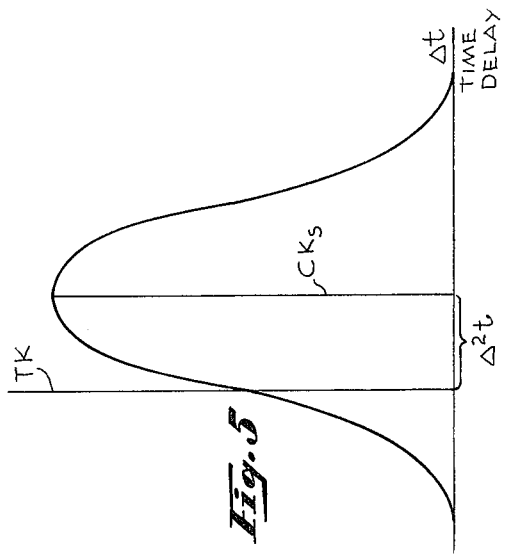
FIGURE 5 is a graph of data obtained with the reproducing system of FIGURE 4.

Generally speaking, when the time delay of the two signals impressed upon the input of one of the cross-correlation units CCU is TD, then the cross-correlation coefficient CK appears at the output of that cross-correlation unit as a specific fixed value, and when all of the cross-correlation coefficients are plotted as a function of the time delay TD, a graph such as that illustrated in FIG. 5 is produced. In that case, the maximum cross-correlation coefficient indicated by the height of the line $CK_s$ of FIG. 5 corresponds to the time delay difference $\Delta^2 t$, which was to be determined. In practice, however, the outputs of the cross-correlation units are scanned in order to plot that graph automatically on the face of an oscilloscope screen SC as indicated in FIG. 4, and the time delay difference $\Delta^2 t$ is measured directly off the screen.

It is thus clear from the foregoing description that with the system illustrated in FIG. 4, the time delay difference $\Delta^2 t$ may be measured for any pair of receiver stations. As a rule, such a measurement is made for at least two such pairs of stations, and the two measurements obtained for the two pairs of stations is employed to locate the unknown transmitter $M_u$. In some cases, the data from only one pair of stations is useful, especially where some other data are available which can assist in locating of the unknown transmitter. In some cases, too, it is advantageous to employ data obtained at three pairs of receiver stations or even at more.

In the description set forth above, it has been assumed that the four receiver stations $RS_{12}$, $RS_{34}$, $RS_{56}$ and $RS_{78}$ all lie on a common line. This is not necessary. The two pairs of stations may be oriented in any other way.

Figure 6:
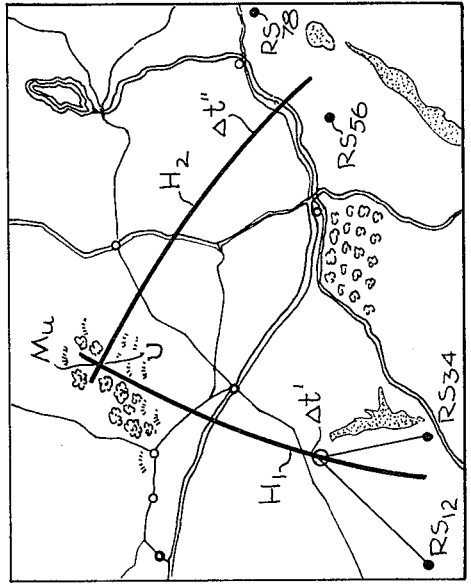
FIGURE 6 illustrates how the data obtained is employed in locating an unknown source.

In FIG. 6 there is shown a map on which is plotted a pair of hyperbolic loci for locating an unknown station. To draw such a map, it is only necessary to recognize that each locus is a hyperbola and that the dimensions of the hyperbola are determined by the velocity of transmission of the signal, in this case the velocity of light, and the time delay $\Delta t_u$ of the signals received at a particular pair of stations from the source to be located. Methods for making such graphs are well known and are described, for example, in Chapter 3 of Volume 4 of the Massachusetts Institute of Technology Radiation Laboratory series, published by McGraw-Hill in 1949. More particularly, if the time delay of signals from the unknown transmitter $M_u$ has the value $\Delta t'$ for signals received at the two receiver stations $RS_{12}$ and $RD_{34}$ and the value at $\Delta t''$ where the pair of receiver stations $RS_{56}$ and $RS_{78}$, the two hyperbolas $H_1$ and $H_2$ corresponding to those values are shown plotted on the graph in FIG. 6. As is well known, two such hyperbolas generally intersect at two points. In this particular case, using auxiliary information that the transmitter is at a point north of the line joining the center of the pairs of receiver stations, it is apparent that the transmitter $M_u$ is located at the point U where the two loci intersect north of the line as shown in FIG. 6.

In some cases where there is ambiguity as to which of the intersections of a pair of hyperbolas correspond to the location of the unknown transmitter, measurements made with respect to signals received at a third pair of receiver stations may be utilized to resolve the ambiguity and in this way determine the location reliably. Also, in the illustration above, four receiver stations have been employed, two of the receiver stations forming one pair and two forming another. It will be understood, of course, that this is not necessary, and that a fewer number of receiver stations could be employed. Thus, for example, if three receiver stations are employed, they can actually be arranged as three pairs of receiver stations and the time delays corresponding to the respective pairs may be employed to plot three hyperbolas to locate the unknown transmitter.

In FIG. 7 there is illustrated another system for measuring the time delay difference between two signals. In this system, the time displacement between two reproduced signals is controlled by the cross-correlation coefficient between them. This cross-correlation coefficient is maximized by adjustment of the time displacement and the relative time displacement that must be introduced in order to maximize the cross-correlation coefficient between the two reproduced signals is measured. Since this time displacement is equal and opposite to the time delay between the two original signals, the measurement of the former provides a measurement of the latter.

In the system illustrated in FIG. 7, a cross-correlator CC2 is employed that utilizes two rotating recording drums DR1 and DR2 upon which two signals that are to be correlated are recorded. In this system, the recorded waves are then reproduced and cross-correlated and the cross-correlation coefficient existing at any time is employed to displace the reproductions of the recorded signals in such a direction as to automatically maximize the cross-correlation factor. In this system, the magnitude of the time displacement required to bring about a maximization of the cross-correlation factor is automatically indicated directly at all times. Thus, with this arrangement, it is not necessary to inspect a series of measurements, such as those displayed on the cathode screen SC of the cross-correlator CC1 of FIG. 4 to determine the time delay. Instead, the time displacement is read directly. The manner in which this system is constructed and operated to achieve this simplification is explained below.

Two recording, or read-in, heads EH1 and EH2 are associated with the respective recording drums DR1 and DR2 of the cross-correlator CC2. The two recording heads EH1 and EH2 are mounted in fixed positions. In this embodiment of the invention, the two recording heads EH1 and EH2 are mounted in the plane that includes the axis of the driving shaft SH, upon which the two drums DR1 and DR2 are mounted. With the two recording heads EH1 and EH2 so mounted, signals that are applied simultaneously to the two inputs $I_1$ and $I_2$ of recording amplifiers $RA_1$ and $RA_2$ are recorded simultaneously on the two drums when the corresponding recording switches RS1 and RS2 are closed. When such signals are recorded on the two drums, the simultaneously recorded parts of the signals are located at the same angular positions on the recording drums DR1 and DR2. Accordingly, two records rotate together on the two drums as the drums are rotated by the driving motor $M_2$ that is connected to the driving shaft SH.

Two reproducing, or read-out, heads $PH_1$ and $PH_2$ are also associated with the two recording drums DR1 and DR2 respectively. One of the reproducing heads $PH_1$ is mounted in a fixed angular position relative to the corresponding recording head EH1. However, the other reproducing head $PH_2$ is angularly movable about the axis of the driving shaft SH. By virtue of the fact that the second reproducing head $PH_2$ is movable relative to the first reproducing head $PH_1$, the signal reproduced by the second head $PH_2$ may be displaced in time relative to the signal reproduced by the first head $PH_1$. With this arrangement, therefore, the relative positions of the two reproducing heads $PH_1$ and $PH_2$ may be altered so as to introduce a time displacement in the reproduced signals that will compensate for any time displacement that existed in the recorded signals. In the embodiment of the invention illustrated in FIG. 7, this adjustment is accomplished automatically.

As used herein, the term "time displacement" means the time delay introduced in the reproduction of two signals. The time displacement of two otherwise identical signals is the same as the time-phase displacement, that is, the difference in times of occurrence of identical phases of the two signals.

More particularly, the second recording head $PH_2$ is mounted on a ring gear RG that is rotatably supported on the shaft SH. The ring gear carries a scale SC which is located adjacent a stationary pointer PT that is concentric with the shaft SH. The ring gear RG is moved by means of a driving gear DG operated through a gear train GT by means of a servo-motor $M_3$.

To operate the servo-motor $M_3$, the signals reproduced by the two reproducing heads $PH_1$ and $PH_2$ are applied through corresponding amplifiers AM1 and AM2 to a multiplier circuit MC. The two amplifiers AM1 and AM2 have different characteristics, the transmission characteristic of one being the derivative of the transmission characteristic of the other. This may be accomplished by utilizing one amplifier AM1 which has uniform amplification over the entire band of frequencies of signals to be reproduced, and to utilize as the other amplifier AM2 one that differentiates the signal over the same band of frequencies. Thus the amplifier AM1 may have a uniform response characteristic over that band, while the amplifier AM2 acts as a differentiator. Likewise, one of the amplifiers may have a uniform response characteristic while the other acts as an integrator. As illustrated, the amplifier AM2 is a differentiating amplifier. In any event, the two amplifiers have characteristics which are related to each other by the time derivative. With such an arrangement, when identical signals are fed through the two amplifiers AM1 and AM2, the derivative of one of the signals is multiplied by the other signal. This product is applied to a rectifier RK that has a time constant very long compared with the period of the signals of interest that have been transmitted through the amplifiers AM1 and AM2. By virtue of this fact, the rectifier produces at its output a signal which is proportional to the product in question.

When the signal from the second reproducing head $PH_2$ is displaced in time relative to the signal reproduced by the first reproducing head $PH_1$, the output of the rectifier RK varies in proportion to the derivative of the cross-correlation function. This relationship is brought out more clearly in FIG. 8. In this figure, the graph CCG1 represents the cross-correlation coefficient plotted as a function of time displacement $\Delta t$, while the graph CCG2 represents the derivative of the graph CCG1 with respect to $\Delta t$. Thus, the graph CCG2 indicates how output of the rectifier varies as a function of the displacement of the reproducing head $PH_1$ relative to the reproducing head $PH_2$. It will be noted in FIG. 8 that the output of the rectifier RK is 0 when the cross-correlation coefficient is a maximum. In accordance with this invention, the output of the rectifier RK is employed to drive the servo-motor $M_3$ in such a direction as to reduce the output of the rectifier RK to 0, and the time displacement required to bring about this null condition is read directly from the scale SC. This will occur so long as the initial position of the movable reproducing head lies between the flex points of the cross-correlation function CCG1.

More particularly, the servo-motor $M_3$ is a two-phase motor, which has one winding connected directly to one phase of a two-phase source $s$ of power, the other winding is supplied with a signal that is 90° out of phase with the signal applied to the other winding, and which is modulated in accordance with the output of the rectifier RK. A polarity reversible amplitude modulator MOD is supplied with a signal of power frequency from the other phase of the two-phase source $s$. The voltage thus supplied to the modulator MOD is modulated by the output of the rectifier RK, thus producing at the output of the modulator a signal which has an amplitude that depends upon the output of the rectifier RK and a polarity that depends upon the sign of the rectifier output. The modulator MOD may be linear, thus producing an output signal which is proportional to the modulating signal from the rectifier RK. However, exact proportionality is not essential to the operation of this invention. The output of the modulator MOD is combined in a signal mixer X with the output of a tachometer generator TG driven by the servo-motor $M_3$ to produce a combined signal which is fed to the winding $W_2$ of the servo-motor through a servo-amplifier SAM. The signal provided by the tachometer generator TG is employed to provide damping, as is conventional in the servo-mechanism part.

The two-phase source $s$ may be formed by a single phase source $p$ by use of suitable phase shift networks, as is well known in the art. In any event, the phases of the signal supplied to the windings $W_1$ and $W_2$ are in quadrature, and the connections are so polarized that when the output of the rectifier RK changes from 0, the servo-motor $M_3$ drives the movable reproducing head $PH_2$ in such a direction as to alter the time displacement in such a way as to restore the output of the rectifier RK to 0. Thus, with this arrangement, the reading of the scale SC that moves with the reproducing head $PH_2$ always corresponds to the time displacement required to maximize the correlation between the two recorded signals.

By applying the output of the unknown amplifiers AU1 and AU2 of FIG. 4 to the inputs $I_1$ and $I_2$ of the cross-correlator CC2 of FIG. 7, and selectively recording on the drums DR1 and DR2 parts of the unknown signals by closing the switches RS1 and RS2 for a predetermined interval the differential time displacement $\Delta^2 t$ that corresponds to that segment of the signal can be read directly from part of the scale SC opposite the pointer PT.

The automatic cross-correlation system of FIG. 7 may also be employed in place of the correlator $O_1$ of FIG. 4. In this case, one of the amplifiers AK1 has a characteristic which is the derivative of the characteristic of the other amplifier AK2, and the multiplier circuit MC and rectifier RK are employed as the correlator $O_1$.

From the foregoing description, it is thus clear that this invention provides a system for locating sources of energy by means of receiver stations which are not in communication with each other or with any common station at the time that records of signals from the energy source are received at those stations. It is thus clear that a system has thus been provided which is capable of a wide variety of uses, and which is particularly adapted for accurately locating a signal source under conditions where such communication would be uneconomical or unsafe to establish. While only certain specific embodiments of the invention have been described herein, it will be understood by those skilled in the art that the invention may be embodied in many other forms without departing from the fundamental principles thereof. As a matter of fact, where several signals are recorded simultaneously from different unknown sources on a similar record track, the time delays corresponding to the different sources may, in some cases, be separately determined from the same records. This can be accomplished, for example, where the peaks of the correlation functions corresponding to signals from the two sources are widely separated. This result may also be accomplished where the signals from the two sources are relatively quiet during different time intervals and the signals received during those time intervals are separately cross-correlated. Furthermore, with this invention, the path followed by the moving unknown source may be determined as a function of time by cross-correlating the signals received from such a source during different time intervals. This invention, for example, may be employed to make a recording over a long period of time in an area under surveillance and then the records may be subsequently analyzed to provide a history of activity of various unknown sources that have been moving in that area during the period of the recording.

Maximum effectiveness of the cross-correlation techniques is obtained when the signals that are being cross-correlated are of an aperiodic character. In other words, for best results the amplitude of intensity of the radiant energy transmitted should be of a fluctuating or variable character. This, of course, is usually the case where the signals that modulate radio waves being received are voice signals or the like.

It will be understood, of course, that the invention is not limited to the specific forms thereof that have been described above, but that it may be practiced in many other ways. More particularly, it will be understood that the signals corresponding to the unknown transmitter could be fed to the correlator that controls the servomotor and that the signals corresponding to the known transmitter could be supplied to the cross-correlator, and the same results obtained by taking proper account of the signs of the time displacements. It will also be understood that the correlation could be performed in other ways and with other apparatus. Though not very practical, the cross-correlation could even be performed manually, but instead of being done solely by an electrical and magnetic tape recording process, it could be accomplished with an optical process. Furthermore, it will be understood that it is not necessary that the radiation from the known source be of the same kind as the radiation from the unknown source. For example, the unknown source might be one from which mechanical or accoustic vibrations are transmitted, while the radiation from the known source is electromagnetic in character. Such a condition would arise, for example, where an attempt is being made to locate a source of mechanical noise as might occur, for example, where the noise is in the form of vibrations transmitted through the earth from a tunneling operation or from an underground bomb test site. Whereas, in such a case, it is necessary that the receivers of the energy emitted or radiated from the unknown source be of a type which detects such mechanical or acoustic energy, the other receiver may be of a type which receives and detects radio waves transmitted from a radio transmitter located at a known point. Furthermore, even though only a magnetic tape recording system has been described, it will be understood that the recorder may be in the form of a disc recorder, a wire recorder, or even a film recorder.

The invention claimed is:

1. In a system for locating a signal-radiating source in an area with reference to a known signal-radiating source: means for receiving signals radiated from both sources at stations positioned at known locations relative to said area; and means at each station for simultaneously recording said radiated signals in time-coordinated manner on a reproducible recording medium, means for correlating the signals from said known source on the recording mediums to thereby provide time delay information relating to signals from said unknown source to said stations.

2. In a system for locating a signal-radiating source in an area with reference to a known signal-radiating signal source: a signal-radiating source at a known location, a signal-radiating source at an unknown location, a pair of signal receivers positioned at each of known locations relative to said area, one receiver at each location being selectively adapted to receive signals radiated from said known source and the other receiver at each location being selectively adapted to receive signals radiated from said unknown source; and means for simultaneously recording the radiated signals reproduced by each pair of signal receivers in time-coordinated manner on a reproducible recording medium, whereby the correlation of signals from said known source received at said locations will provide time delay information relating to signals from said unknown source to said locations.

3. In a system for locating a signal-radiating source in an area with reference to a known source: means for receiving signals from both sources at a pair of signal receivers located at each of two spaced-apart stations positioned at known locations relative to said area; means for simultaneously recording the signals reproduced by each pair of signal receivers in time-coordinated manner on a reproducible recording medium; means for reproducing the recorded signals corresponding to said known source as a first pair of reproduced recorded signals; means for reproducing the recorded signals corresponding to said unknown source as a second pair of reproduced recorded signals; means for cross-correlating each pair of reproduced recorded signals to generate corresponding cross-correlation coefficient signals; and means controlled in accordance with the cross-correlation coefficient signals corresponding to the two pairs of reproduced recorded signals for measuring the time delay in the transmission of a signal from the unknown source to said locations.

4. In a system for locating a signal-radiating source in an area with reference to a known source: two pairs of signal receivers positioned at known locations relative to said area, one receiver of each pair being selectively adapted to receive signals radiated from said known source and the other receiver of each pair being selectively adapted to receive signals from said unknown source; means for simultaneously recording the signals reproduced by each pair of signal receivers in time-coordinated manner on a reproducible recording medium; means for reproducing the recorded signals corresponding to said known source as a first pair of reproduced recorded signals; means for reproducing the recorded signals corresponding to said unknown source as a second pair of reproduced recorded signals; means for cross-correlating each pair of reproduced recorded signals to generate corresponding cross-correlation coefficient signals; and means controlled in accordance with the cross-correlation coefficient signals corresponding to the two pairs of reproduced recorded signals for measuring the time delay in the transmission of a signal from the unknown source to said locations.

5. In a system for locating a signal-radiating source in an area with reference to a known source: at least three pairs of signal receivers positioned at known locations relative to said area, one receiver of each pair being selectively adapted to receive signals radiated from said known source and the other receiver of each pair being selectively adapted to receive signals from said unknown source; means for simultaneously recording the signals reproduced by each pair of signal receivers in time-coordinated manner on a reproducible recording medium; means for simultaneously reproducing the signals corresponding to said known source and recorded at two of said locations as a first pair of reproduced recorded signals; means for simultaneously reproducing the recorded signals corresponding to said unknown source and recorded at said two locations as a second pair of reproduced recorded signals; means for cross-correlating each pair of said reproduced recorded signals to generate corresponding cross-correlation coefficient signals; and means controlled in accordance with the cross-correlation coefficient signals corresponding to said first and second pairs of reproduced recorded signals for measuring the time delay in the transmission of a signal from the unknown source to said locations.

6. In a system for locating a signal-radiating source in an area with reference to a known signal source: means for receiving signals from both of said sources at two separate receiver stations located at known points relative to said area; means for simultaneously recording the signals received at each station in time-coordinated manner as a separate reproducible record; means for reproducing signals recorded on both of said records, thereby generating two reproduced known signals corresponding to the respective locations and two reproduced unknown signals corresponding to the respective locations; means for synchronizing the reproduction of the pair of said signals from one of said sources; and cross-correlation means controlled by the reproduction of the pair of signals from the other of said sources for generating and indication of the time delay difference of the reception of the signals from the two sources at said two locations respectively.

7. In a system for locating a signal-radiating source in an area with reference to a known signal source: two pairs of signal receivers positioned at known locations relative to said area, one receiver of each pair being selectively adapted to receive signals from said known sources and the other receiver of each pair being selectively adapted to receive signals from said unknown source; means for simultaneously recording the signals reproduced by each pair of signal receivers in time-coordinated manner as a separate reproducible record; means for reproducing signals recorded on both of said records, thereby generating two reproduced known signals corresponding to the respective locations and two reproduced unknown signals corresponding to the respective locations; means for synchronizing the reproduction of the pair of said signals from one of said sources; and cross-correlation means controlled by the reproduction of the pair of signals from the other of said sources for generating an indication of the time delay difference of the reception of the signals from the two sources to the pairs of receivers at said two locations respectively.

8. In a system for locating a signal-radiating source in an area with reference to a known signal source: means for receiving signals from both of said sources at two separate receiver stations located at known points relative to said area; means for simultaneously recording the signals received at each station in time-coordinated manner as a separate reproducible record; means for reproducing signals recorded on both of said records, thereby generating two reproduced known signals corresponding to the respective locations and two reproduced unknown signals corresponding to the respective locations; means for synchronizing the reproduction of the two known signals; and cross-correlation means controlled by the reproduced unknown signals for generating an indication of the time delay difference of the reception of the signals from the two sources at said two locations respectively.

9. A system for locating a signal-radiating source as defined in claim 6 in which said synchronizing means comprises a correlator controlled by said pair of known reproduced signals and a servo-unit controlled by said correlator for causing the reproduced signals from said one source to be reproduced in synchronism.

10. In a system for cross-correlating a pair of unknown signals recorded on a pair of reproducible records that also carry a pair of synchronizing signals: two record reproducers, each having a member movable relative to a corresponding reproducing head, each of said movable members carrying a corresponding record that bears one of said synchronizing signals and one of said unknown signals, each member moving the unknown signal carried thereby past the corresponding reproducing head, thereby generating a corresponding reproduced unknown signal; means controlled by said synchronizing signals for synchronizing the movement of the records carried by said members relative to said reproducing heads; and cross-correlation means controlled by said reproduced unknown signals for providing an indication of the time displacement of corresponding parts of the signals of said reproduced unknown signals.

11. In a system for cross-correlating a pair of unknown signals recorded on a pair of reproducible records that also carry a pair of synchronizing signals: two record reproducers, each having a member movable relative to corresponding first and second reproducing heads, each of said movable members carrying a corresponding record that bears one of said synchronizing signals and one of said unknown signals, each member moving the synchronizing signal carried thereby past the corresponding first reproducing head, thereby generating a corresponding reproduced synchronizing signal, each member also moving the unknown signal carried thereby past the corresponding second reproducing head, thereby generating a corresponding reproduced unknown signal; means controlled by said reproduced synchronizing signals for synchronizing the movement of the records carried by said members relative to said first reproducing heads; and cross-correlation means controlled by said reproduced unknown signals for providing an indication of the time displacement of corresponding parts of the signals of said reproduced unknown signals.

12. In a system for cross-correlating signals recorded on a pair of reproducible records: two record carriers; differential means for differentially connecting said record carriers to a motor; a first pair of reproducing elements for reproducing a first pair of signals recorded on the two records respectively; a second pair of reproducing elements for reproducing a second pair of signals recorded on the two records respectively; means including a cross-correlator controlled by said first pair of reproducing elements for operating said differential means to cause said first pair of signals to be reproduced in synchronism; and cross-correlation means controlled by said second pair of reproducing elements for providing an indication of the time displacement of corresponding parts of the signals of said second pair of reproduced signals.

13. In a system for cross-correlating signals recorded on a pair of reproducible records: two record carriers; differential means for differentially connecting said record carriers to a motor; a first pair of reproducing elements for reproducing a first pair of signals recorded on the two records respectively; a second pair of reproducing elements for reproducing a second pair of signals recorded on the two records respectively; a means including a cross-correlator controlled by said first pair of reproducing means and a servo-motor connected to said differential means to cause said first pair of signals to be reproduced in synchronism; and cross-correlation means controlled by said second pair of reproducing elements for providing an indication of the time displacement of corresponding parts of the signals of said second pair of reproduced signals.

14. In a system for cross-correlating a pair of signals carried by a pair of reproducible records: two record reproducers each having a member movable relative to a corresponding reproducing head, each of said movable members carrying a corresponding record bearing one of said signals; means for operating said reproducers to carry said records past the corresponding reproducing heads, thereby generating corresponding reproduced signals that bear a time-phase relationship corresponding to the relative displacement of said heads relative to reference points on said records; multiplier means having two inputs and an output; two electrical circuits connecting the two reproducing means to the respective inputs of said multiplier means, the transmission characteristic of one of said electrical circuits bearing a time-derivative relationship to the transmission characteristic of the other of said electrical circuits; and means controlled by said multiplier means for altering the relative displacement of said heads relative to said reference points on said records, whereby the relative time-phase relationship of the two reproduced unknown signals may be varied to synchronize said reproduced signals.

15. In a system for cross-correlating a pair of signals carried by a pair of reproducible records: two record reproducers each having a member movable relative to a corresponding reproducing head, each of said movable members carrying a corresponding record bearing one of said unknown signals; means for operating said reproducers to carry said records past a pair of stationary reference points in predetermined time relationship and past the corresponding reproducing heads, thereby generating corresponding reproduced signals that bear a time-phase relationship corresponding to the relative displacement of said heads relative to said stationary reference points; multiplier means having two inputs and an output; two electrical circuits connecting the two reproducing means to the respective inputs of said multiplier means, the transmission characteristic of one of said electrical circuits bearing a time-derivative relationship to the transmission characteristic of the other of said electrical circuits; and means controlled by said multiplier means for altering the relative displacement of said reproducing heads relative to said stationary reference points, whereby the relative time-phase relationship of the two reproduced unknown signals may be varied to synchronize said reproduced signals.

16. In a system for cross-correlating a pair of signals carried by a pair of reproducible records: two record reproducers each having a member movable relative to a corresponding reproducing head, each of said movable members carrying a corresponding record bearing one of said signals; means for operating said reproducers to carry said records past the corresponding reproducing heads, thereby generating corresponding reproduced signals; multiplier means having two inputs and an output; two electrical circuits connecting the two reproducing means to the respective inputs of said multiplier means, the transmission characteristic of one of said electrical circuits bearing a time-derivative relationship to the transmission characteristic of the other of said electrical circuits; and means controlled by the output of said multiplier means for synchronizing said two reproduced unknown signals.

17. In a system for cross-correlating a pair of signals carried by a pair of reproducible records: two record reproducers each having a member movable relative to a corresponding reproducing head, each of said movable members carring a corresponding record bearing one of said signals; means for operating said reproducers to carry said records past the corresponding reproducing heads, thereby generating corresponding reproduced signals; multiplier means having two inputs and an output; two electrical circuits connecting the two reproducing means to the respective inputs of said multiplier means, the transmission characteristic of one of said electrical circuits bearing a time-derivative relationship to the transmission characteristic of the other of said electrical circuits; means controlled by the output of said multiplier means for changing the difference in the positions of said reproducing heads relative to the corresponding records, whereby the relative time-phase relationship of the two reproduced signals may be varied to synchronize said reproduced signals; and means controlled in accordance with said head positions for indicating the time displacement between said signals.

18. A method of locating an unknown signal-radiating source with reference to a known signal-radiating source, comprising: establishing a plurality of signal-receiving stations at known positions relative to the known signal-radiating source and relative to the area in which the unknown signal-radiating source is located; placing a pair of signal receivers at each of said receiving stations; selectively receiving signals that are simultaneously emitted from said known source at one receiver at each of said stations; receiving signals that are simultaneously emitted from said unknown source at the other receiver at each of said stations; recording the waves received from both sources at each station; moving the records from each station to an interpretation center; subsequently reproducing at the interpretation center the signals recorded at two receiving stations; combining the reproduced signals from said known source to produce a first cross-correlation signal; combining the reproduced signals from said unknown source to produce a second cross-correlation signal; and utilizing said cross-correlation signals to measure the time delay in the arrival at said two stations of signals simultaneously emitted from said unknown source.

19. A method of locating an unknown signal-radiating source with reference to a known signal-radiating source, comprising: establishing two pairs of signal-receiving stations at known positions relative to the known signal-radiating source and relative to the area in which the unknown signal-radiating source is located; placing a pair of signal receivers at each of said receiving stations; selectively receiving signals that are simultaneously emitted from said known source at one receiver at each of said stations; receiving signals that are simultaneously emitted from said unknown source at the other receiver at each of said stations; recording the waves received from both sources at each station; moving the records from said station to an interpretation center; subsequently reproducing at the interpretation center the signals recorded at each pair of receiving stations; combining the signals from said known source reproduced from the records recorded at each pair of receiving stations to produce a corresponding first cross-correlation signal with respect to each pair of receiving stations; combining the signals from said unknown source reproduced from the records recorded at each pair of receiving stations to produce a corresponding second cross-correlation signal with respect to each pair of receiving stations; and utilizing the two cross-correlation signals obtained with respect to each pair of receiving stations to determine the time delay in the arrival at each pair of stations of signals simultaneously emitted from said unknown source.

20. A method of locating an unknown signal-radiating source with reference to a known signal-radiating source, comprising: establishing a plurality of signal-receiving stations at known positions relative to the known signal-radiating source and relative to the area in which the unknown signal-radiating source is located; placing a pair of signal receivers at each of said receiving stations; selectively receiving signals that are simultaneously emitted from said known source at one receiver at each of said stations; receiving signals that are simultaneously emitted from said unknown source at the other receiver at each of said stations; recording the waves received from both sources at each station; moving the records from each station to an interpretation center; subsequently reproducing at the interpretation center the signals recorded at two receiving stations from said known station; generating a signal that varies in accordance with the cross-correlation coefficient of the reproduced signals from said known source; varying the time displacement of the reproduced signals from said known source to ascertain the time displacement corresponding to synchronization of the reproduced signals from said known source; generating a signal that varies in accordance with the cross-correlation coefficient of the reproduced signals from said unknown source; varying the time displacement of the reproduced signals from said unknown source to ascertain the time displacement corresponding to synchronization of the reproduced signals from said unknown source; and determining the time delay in the arrival at said two receiver stations of signals simultaneously emitted from said unknown source from said time displacement.

References Cited in the file of this patent

UNITED STATES PATENTS

| | | |
|---|---|---|
| 2,166,991 | Guanella | July 25, 1939 |
| 2,817,081 | Roberts | Dec. 17, 1957 |

OTHER REFERENCES

QST—April 1958, pp. 48, 49.